US012062461B2

(12) United States Patent
Welter (10) Patent No.: US 12,062,461 B2
(45) Date of Patent: Aug. 13, 2024

(54) SUPPORTS WITH INTEGRATED SENSORS FOR NUCLEAR REACTOR STEAM GENERATORS, AND ASSOCIATED SYSTEMS AND METHODS

(71) Applicant: NuScale Power, LLC, Portland, OR (US)

(72) Inventor: Kent Welter, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 78 days.

(21) Appl. No.: 17/168,118

(22) Filed: Feb. 4, 2021

(65) Prior Publication Data

US 2022/0246319 A1  Aug. 4, 2022

(51) Int. Cl.
  *G21C 17/112* (2006.01)
  *G21C 15/18* (2006.01)
  (Continued)

(52) U.S. Cl.
  CPC .......... *G21C 17/112* (2013.01); *G21C 15/182* (2013.01); *G21C 17/102* (2013.01);
  (Continued)

(58) Field of Classification Search
  CPC .... G21C 17/112; G21C 17/102; G01N 27/90; B33Y 10/00; B33Y 80/00; F22B 37/003;
  (Continued)

(56) References Cited

U.S. PATENT DOCUMENTS 106,392 A    8/1870  Morris
813,098 A    2/1906  Johnson
(Continued)

FOREIGN PATENT DOCUMENTS

CN    101310157 A    11/2008
CN    101349366 A    1/2009
(Continued)

OTHER PUBLICATIONS

Laffont, Guillaume, et al. "Temperature resistant fiber Bragg gratings for on-line and structural health monitoring of the next-generation of nuclear reactors." Sensors 18.6 (2018): 1791. (Year: 2018).*

(Continued)

*Primary Examiner* — Lily C Garner
(74) *Attorney, Agent, or Firm* — Lee & Hayes, P.C.

(57) ABSTRACT

Supports with integrated sensors for nuclear reactor steam generators, and associated systems and methods, are disclosed. A representative method for forming a nuclear-powered steam generator includes forming an instrumented support, the instrumented support including a carrier portion and a retainer portion, with at least one of the carrier portion or the retainer portion being integrally formed with a sensor via an additive manufacturing process. The method can further include coupling the sensor to a communication link, supporting a helical steam conduit on the instrumented support, and installing the helical steam conduit and the instrumented support in a nuclear reactor. The helical steam conduit is positioned along a primary flow path, which is in turn positioned to circulate a heated primary flow in thermal communication with the helical steam conduit.

12 Claims, 6 Drawing Sheets

(51) Int. Cl.
*G21C 17/10* (2006.01)
*B33Y 10/00* (2015.01)
*F22B 1/16* (2006.01)
*F28D 7/02* (2006.01)
*F28F 9/00* (2006.01)

(52) U.S. Cl.
CPC ............... *B33Y 10/00* (2014.12); *F22B 1/162* (2013.01); *F28D 7/02* (2013.01); *F28F 9/00* (2013.01)

(58) Field of Classification Search
CPC .... F22B 1/162; F28D 7/02; F28F 9/00; F16L 3/227; F16L 3/02
See application file for complete search history.

(56) References Cited

U.S. PATENT DOCUMENTS

| | | | |
|---|---|---|---|
| 2,212,542 A | 8/1940 | Jones | |
| 2,222,349 A | 11/1940 | Jones | |
| 2,239,895 A | 4/1941 | Kuhner | |
| 2,399,467 A | 4/1946 | Chandler | |
| 2,423,697 A | 7/1947 | Garfield | |
| 2,792,490 A | 5/1957 | Risch et al. | |
| 3,332,477 A | 7/1967 | Saunders | |
| 3,700,030 A | 10/1972 | Bosquain et al. | |
| 3,854,529 A | 12/1974 | Sagan | |
| 3,998,268 A | 12/1976 | Sagan | |
| 4,098,329 A | 7/1978 | Culver | |
| 4,163,470 A | 8/1979 | Johnsen et al. | |
| 4,231,421 A | 11/1980 | Eaton et al. | |
| 4,447,942 A | 5/1984 | Jabsen | |
| 4,709,756 A * | 12/1987 | Wilson | F28F 9/0135 165/162 |
| 4,720,840 A * | 1/1988 | Lagally | F28F 9/0132 165/69 |
| 4,737,337 A | 4/1988 | Garabedian et al. | |
| 5,474,585 A | 12/1995 | Geibel et al. | |
| 5,726,408 A | 3/1998 | Easterday | |
| 6,080,982 A * | 6/2000 | Cohen | B63H 23/321 340/682 |
| 6,367,430 B1 | 4/2002 | Schneider | |
| 6,498,827 B1 | 12/2002 | Klarner | |
| 6,672,260 B1 | 1/2004 | Sun | |
| 6,772,832 B2 | 8/2004 | Schneider | |
| 6,810,101 B2 | 10/2004 | Klarner | |
| 6,904,754 B2 | 6/2005 | Sim et al. | |
| 6,914,955 B2 | 7/2005 | Klarner | |
| 8,572,847 B2 | 11/2013 | Klarner et al. | |
| 8,695,688 B2 | 4/2014 | Schneider et al. | |
| 8,794,302 B2 | 8/2014 | Schneider et al. | |
| 9,188,328 B2 | 11/2015 | Williams et al. | |
| 10,859,411 B2 * | 12/2020 | Alemohammad | G01D 5/35358 |
| 11,236,957 B2 * | 2/2022 | Rhoden | B23K 26/342 |
| 11,525,750 B2 * | 12/2022 | Petrie | G01D 5/268 |
| 2010/0064988 A1 | 3/2010 | Nam et al. | |
| 2010/0096115 A1 | 4/2010 | Erickson | |
| 2010/0036181 A1 | 12/2010 | Thome et al. | |
| 2010/0316181 A1 * | 12/2010 | Thome | G21C 1/322 122/235.23 |
| 2012/0224663 A1 | 9/2012 | Patel et al. | |
| 2015/0184775 A1 * | 7/2015 | Koski | F16L 3/227 248/68.1 |
| 2016/0009030 A1 | 1/2016 | Mark et al. | |
| 2016/0022373 A1 | 1/2016 | Valsamis et al. | |
| 2016/0305271 A1 * | 10/2016 | Schmidt | B32B 15/14 |
| 2017/0286821 A1 * | 10/2017 | Nardi | G01D 9/005 |
| 2018/0141274 A1 * | 5/2018 | Fink | H01B 7/0233 |
| 2019/0331441 A1 * | 10/2019 | Rhoden | B23K 26/342 |
| 2021/0033479 A1 * | 2/2021 | Petrie | G01L 11/025 |
| 2022/0246319 A1 | 8/2022 | Welter | |

FOREIGN PATENT DOCUMENTS

| | | | | |
|---|---|---|---|---|
| CN | 203024130 U | 6/2013 | | |
| CN | 203024131 U | 6/2013 | | |
| DE | 4337402 A1 * | 4/1995 | | E21B 47/06 |
| JP | S591065 A | 1/1984 | | |
| JP | S63176434 U | 11/1988 | | |
| WO | 2015099854 A1 | 7/2015 | | |
| WO | WO-2018194482 A1 * | 10/2018 | | |

OTHER PUBLICATIONS

Jinesh, Mathew, et al. "Stainless steel component with compressed fiber Bragg grating for high temperature sensing applications." Sixth European Workshop on Optical Fibre Sensors. vol. 9916. SPIE, 2016. (Year: 2016).*
Hehr, Adam, et al. "Smart build-plate for metal additive manufacturing processes." Sensors 20.2 (2020): 360. (Year: 2020).*
Havermann, Dirk, et al. "Temperature and strain measurements with fiber Bragg gratings embedded in stainless steel 316." Journal of lightwave technology 33.12 (2014): 2474-2479. (Year: 2014).*
Maier, Robert RJ, et al. "Embedded fiber optic sensors within additive layer manufactured components." IEEE Sensors Journal 13.3 (2012): 969-979. (Year: 2012).*
Petrie, Christian M., et al. "Embedded sensors in additively manufactured silicon carbide." Journal of Nuclear Materials 552 (2021): 153012. (Year: 2021).*
DON Innovation "Sensor Embedding in Additive Manufacturing (SEAM) Team" May 2016; Retrieved from https://www.secnav.navy.mil/innovation/Documents/2016/05/SEAMTeam.pdf. 3 pages.
Fabrisonic "Embedding Thermocouples in Solid Metal" Poster retrieved from https://fabrisonic.com/fabrication/wp-content/uploads/2016/05/Embedding_Thermocouples.pdf on Oct. 12, 2021. 1 page.
PennState "ARPA-E awards Penn State $4.7M for advancing sensor integration in gas turbines" Mar. 25, 2019. Retrieved from https://www.me.psu.edu/news-archive/2019/ARPA-E-START.aspx. 4 pages.
Tsai, H.-L. et al. "Additive Manufacturing of Smart Parts with Embedded Sensors for In-Situ Monitoring in Advanced Energy Systems" NETL Crosscutting Technology Research Review Meeting, Pittsburgh, PA, Mar. 20, 2017. 56 pages.
Exner, R. "Analysis and Manufacture of the HTR-100 Steam Generator" Balcke-Durr AG, pp. 130-140.
Fricker, H. "Design and Manufacturing Experience for the German Thorium High-Temperature Reactor 300-MW(e) Steam Generator" Nuclear Technology, vol. 28, Mar. 1976, pp. 339-347.—Abstract Only.
Glosser, R. "Experimental Evaluation of Helical Consolidated Nuclear Steam Generator (CNSG) Tubes and Supports" Prepared for United States Maritime Administration by the Babcock & Wilcox Company, Nov. 1975.—Abstract Only.
Isa, International Preliminary Report on Patentability for PCT/US2011/059259 issued May 7, 2013. 7 pages.
Isa, International Search Report and Written Opinion for PCT/US2011/059259 issued May 16, 2012. 9 pages.
Isa, International Search Report and Written Opinion for PCT/US2014/057539 issued Jun. 5, 2015. 14 pages.
Quade, R.N. et al. "The design of the Fort St. Vrain steam generators" Nuclear Engineering and Design, 1974; vol. 26, No. 1, pp. 118-134. Abstract Only.
Reyes "NuScale Power Introduction to NuScale Design" US Nuclear Regulatory Commission Pre-Application Neeting; Rockville, MD, Jul. 24, 2008. 26 pages.
Isa, International Search Report and Written Opinion for PCT/US22/14610 mailed Oct. 26, 2022, 23 pages.

* cited by examiner

SUPPORTS WITH INTEGRATED SENSORS FOR NUCLEAR REACTOR STEAM GENERATORS, AND ASSOCIATED SYSTEMS AND METHODS

STATEMENT REGARDING FEDERALLY SPONSORED RESEARCH

This invention was made with Government support under Contract No. DE-NE0008928 awarded by the Department of Energy. The Government has certain rights in this invention.

TECHNICAL FIELD

The present technology is directed generally to supports with integrated sensors for nuclear reactor steam generators, and associated systems and methods.

BACKGROUND

Nuclear power plants have been used for many years to generate steam, which is then converted to electrical power via a steam turbine. Large power plants can be used to provide electricity to corresponding large geographical areas, while relatively small power plants can be used to power smaller geographical areas, submarines, spacecraft, and/or other power-demanding systems and subsystems. In addition to providing electricity, nuclear reactors can be used for one or more other purposes, including, but not limited to desalinating seawater and creating nuclear isotopes for medical purposes.

Nuclear reactors typically include a significant amount of instrumentation to monitor system conditions and respond, as needed, by changing the parameters in accordance with which the reactors operate. While existing sensor systems have been adequate, there remains a need for improving the accuracy and manufacturability of such sensors in a manner that does not significantly increase the complexity and/or cost of the overall system.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Aspects of the present technology are directed generally toward supports having integrated sensors for operation in nuclear reactor steam generators. In particular embodiments, the supports carry a helical arrangement of steam generator conduits, which receive heat from a nuclear reactor core and generate steam which is then used to generate electrical power. The supports can include integrally formed sensors, which can accurately identify parameters associated with the operation of the steam generator, in a manner that provides for increased robustness and/or reliability. For example, the sensors can include additively manufactured optical strain gauges that are formed directly in the supports that keep the conduits in position within the nuclear reactor. By integrally forming the sensors with the supports, the sensors can more accurately identify changes in the characteristics, e.g., vibrations or oscillations, of the supports (and the associated conduits), and can be protected by virtue of being buried within the supports.

Certain details are set forth in the following description and in FIGS. 1-4 to provide a thorough understanding of various embodiments of the present technology. In other instances, well-known structures, materials, operations, and/or systems often associated with nuclear reactors, steam generators, and/or sensors are not shown or described in detail in the following disclosure to avoid unnecessarily obscuring the description of the various embodiments of the technology. Those of ordinary skill in the relevant art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. For example, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope unless expressly indicated. The sizes of various depicted elements are not necessarily drawn to scale, and these various elements may be enlarged to improve legibility. Component details may be abstracted in the Figures to exclude details, such as the positions of components and/or certain precise connections between such components, when such details are unnecessary for a complete understanding of how to make and use the present technology. Many of the details, dimensions, angles and other features shown in the Figures are merely illustrative of particular embodiments of the disclosure. Accordingly, other embodiments can have other suitable details, dimensions, angles and features without departing from the present technology. In addition, those of ordinary skill in the art will appreciate that further embodiments of the present technology can be practiced without several of the details described below.

The overall arrangement of a representative system is described below with reference to FIG. 1. Specific elements of the steam generator and associated sensors are then described in further detail below with reference to FIGS. 2A-4.

Figure 1:
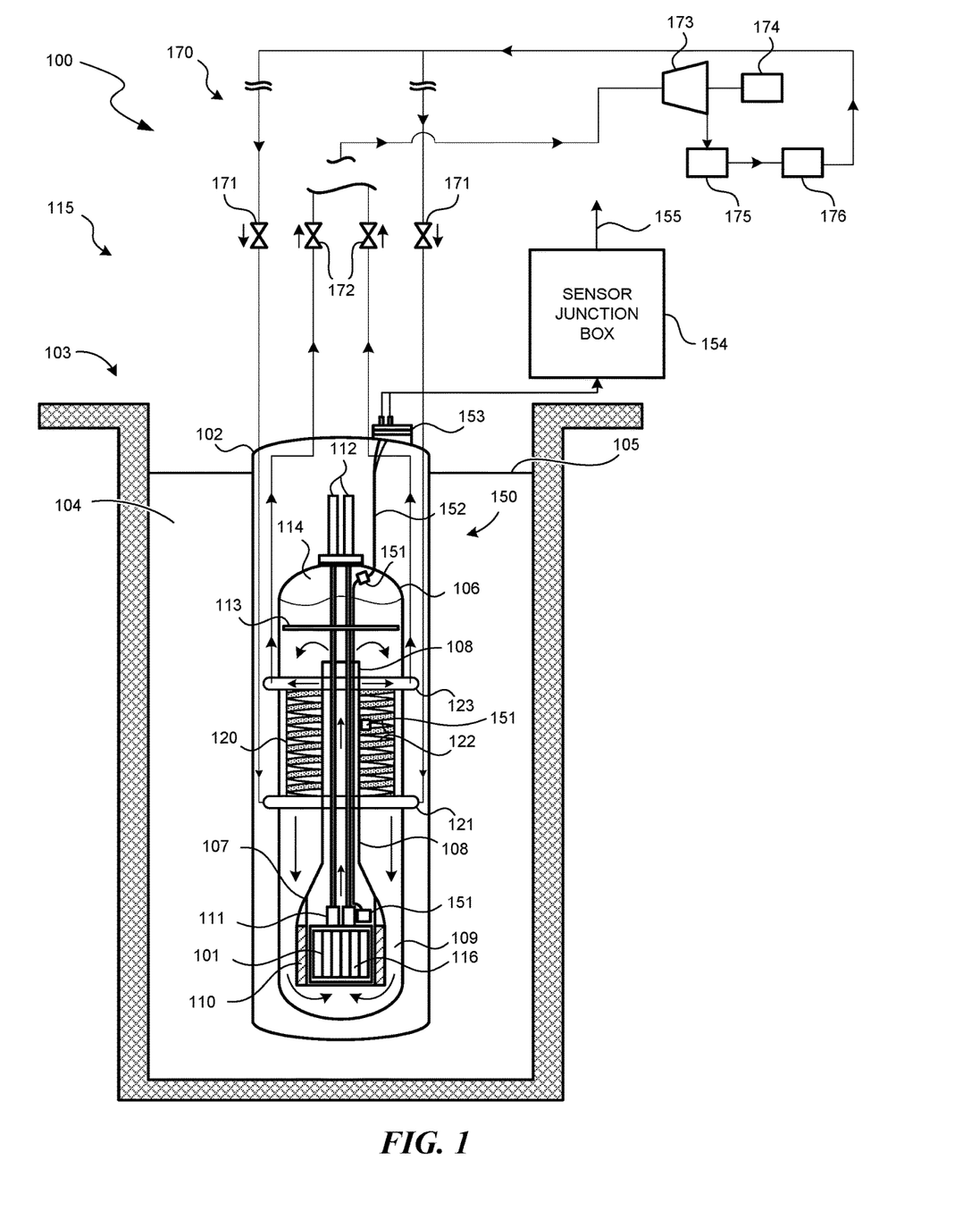
FIG. 1 is a partially schematic, cross-sectional illustration of a representative system configured in accordance with embodiments of the present technology.

FIG. 1 is a partially schematic, partial cross-sectional illustration of a nuclear reactor system 100. The system 100 can include a power module 115 having a reactor core 101 in which a controlled nuclear reaction takes place. Accordingly, the reactor core 101 can include one or more fuel assemblies 116. The fuel assemblies 116 can include fissile and/or other suitable materials. Heat from the reaction generates steam at a steam generator 120, which directs the steam to a power conversion system 170. The power conversion system 170 generates electrical power, and/or provides other useful outputs. A sensor system 150 is used to monitor the operation of the power module 115 and/or other system components. The data obtained from the sensor system 150 can be used in real time to control the power module 115, and/or can be used to update the design of the power module 115 and/or other system components.

The power module 115 includes a containment vessel 102 that houses/encloses a reactor pressure vessel 106, which in turn houses the reactor core 101. The containment vessel 102 can be housed in a power module bay 103. The power module bay 103 can contain a cooling pool 104 filled with water and/or another suitable cooling liquid. The bulk of the power module 115 can be positioned below the surface 105 of the cooling pool 104. Accordingly, the cooling pool 104 can operate as a thermal sink, e.g., in the event of a system malfunction.

A volume between the reactor pressure vessel 106 and the containment vessel 102 can be partially or completely evacuated to reduce heat transfer from the reactor pressure vessel 106 to the surrounding environment (e.g., to the cooling pool 104). However, in other embodiments the volume between the reactor pressure vessel 106 and the containment vessel 102 can be at least partially filled with a gas and/or a liquid that increases heat transfer between the reactor pressure vessel 106 and the containment vessel 102.

Within the reactor pressure vessel 106, a primary coolant 109 conveys heat from the reactor core 101 to the steam generator 120. For example, as illustrated by arrows located within the pressure vessel 106, the primary coolant 109 is heated at the reactor core 101 toward the bottom of the reactor pressure vessel 106. The heated primary coolant (e.g., water with or without additives) rises from the reactor core 101 through a core shroud 107 and to a riser tube 108. The hot, buoyant primary coolant 109 continues to rise through the riser tube 108, then exits the riser tube 108 and passes downwardly through the steam generator 120. The steam generator 120 includes a multitude of conduits 122 that are arranged circumferentially around the riser tube 108, for example, in a helical pattern, as is shown schematically in FIG. 1. The descending primary coolant 109 transfers heat to a secondary coolant (e.g., water) within the conduits 122, and descends to the bottom of the reactor pressure vessel 106 where the cycle begins again. The cycle can be driven by the changes in the buoyancy of the primary coolant 109, thus reducing or eliminating the need for pumps to move the primary coolant 109.

The steam generator 120 includes a feedwater header 121 by which the incoming secondary coolant enters the steam generator conduits 122. The secondary coolant rises through the conduits 122, converts to vapor (e.g., steam), and is collected at a steam header 123. The steam exits the steam header 123 and is directed to the power conversion system 170.

The power conversion system 170 can include one or more steam valves 172 that regulate the passage of high pressure, high temperature steam from the steam generator 120 to a steam turbine 173. The steam turbine 173 converts the thermal energy of the steam to electricity via a generator 174. The low pressure steam exiting the turbine 173 is condensed at a condenser 175, and then directed (e.g., via a pump 176) to one or more feedwater valves 171. The feedwater valves 171 control the rate at which the feedwater re-enters the steam generator 120 via the feedwater header 121.

The power module 115 includes multiple control systems and associated sensors. For example, the power module 115 can include a hollow cylindrical reflector 110 that directs neutrons back into the reactor core 101 to further the nuclear reaction taking place therein. Control rods 111 are used to modulate the nuclear reaction, and are driven via fuel rod drivers 112. The pressure within the reactor pressure vessel 106 can be controlled via a pressurizer plate 113 (which can also serve to direct the primary coolant 109 downwardly through the steam generator 120) by controlling the pressure in a pressurizing volume 114 positioned above the pressurizer plate 113.

The sensor system 150 can include one or more sensors 151 positioned at a variety of locations within the power module 115 and/or elsewhere, e.g., to identify operating parameter values and/or changes in parameter values, etc. The data collected by the sensor system 150 can then be used to control the operation of the system 100, and/or to generate design changes for the system 100. For some sensors positioned within the containment vessel 102, a sensor link 152 directs data from the sensors to a flange 153 (at which the sensor link 152 exits the containment vessel 102) and directs data to a sensor junction box 154. From there, the sensor data can be routed to one or more controllers and/or other data systems via a data bus 155.

One challenge associated with nuclear reactors and, in particular, steam generators within the reactors, is that the process of converting water to steam may not occur uniformly or smoothly within the steam generator. In particular, density waves can form within the conduits of the steam generator, creating density wave oscillations, which produce vibrations and stresses on the conduits and/or other elements of the steam generator. As described in further detail below with reference to FIGS. 2A-4, aspects of the present technology are directed to improved sensors and associated techniques for detecting characteristics of the steam generator, including strains produced by density wave oscillations.

Figure 2A:
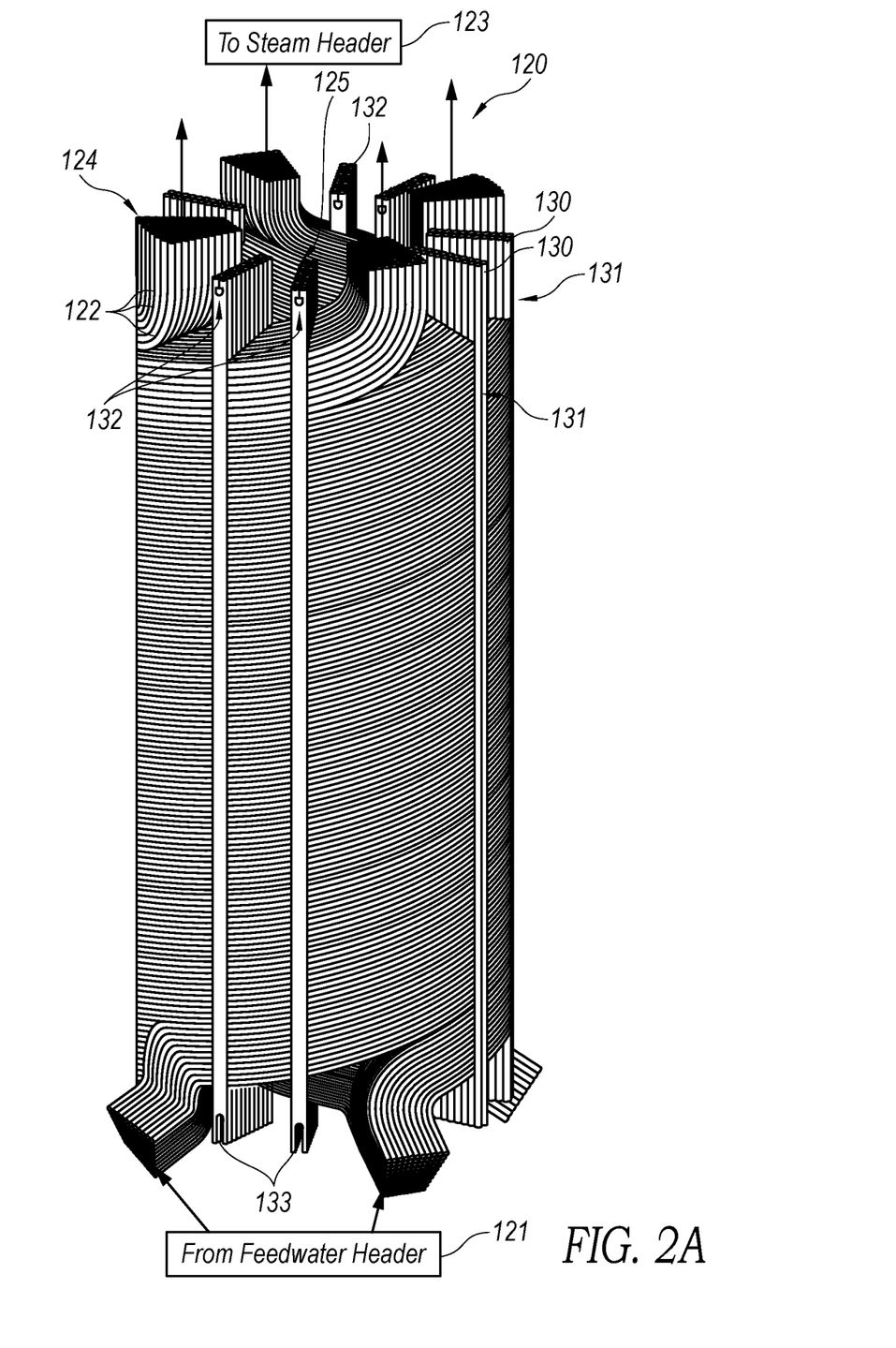
FIG. 2A is a partially schematic illustration of a portion of a steam generator that includes conduit supports configured in accordance with embodiments of the present technology.

FIG. 2A is a partially schematic, isometric illustration of a representative steam generator 120 having a multitude of conduits 122 arranged around a central opening 125. The central opening 125 accommodates the riser tube 108, described above with reference to FIG. 1. The conduits 122 can be arranged in one or more conduit bundles 124 that circle the central opening 125 in a helical fashion to provide extensive thermal and fluid contact between the outer walls of the conduits 122 and the surrounding primary coolant. Water enters the conduits 122 from the feedwater header 121 and exits via the steam header 123. The conduits 122 can be supported via multiple conduit supports 130. Individual conduit supports 130 can be arranged in conduit support stacks 131 that extend radially outwardly from the central opening 125. Each conduit support 130 can include an upper support rail aperture 132 and a lower support rail aperture 133 so as to be aligned along corresponding rails, described later with reference to FIG. 2C. In the illustrated embodiment, four conduits 122 are shown; it is understood that the above is merely one illustrative example to which the disclosed subject matter is not limited.

Figure 2B:
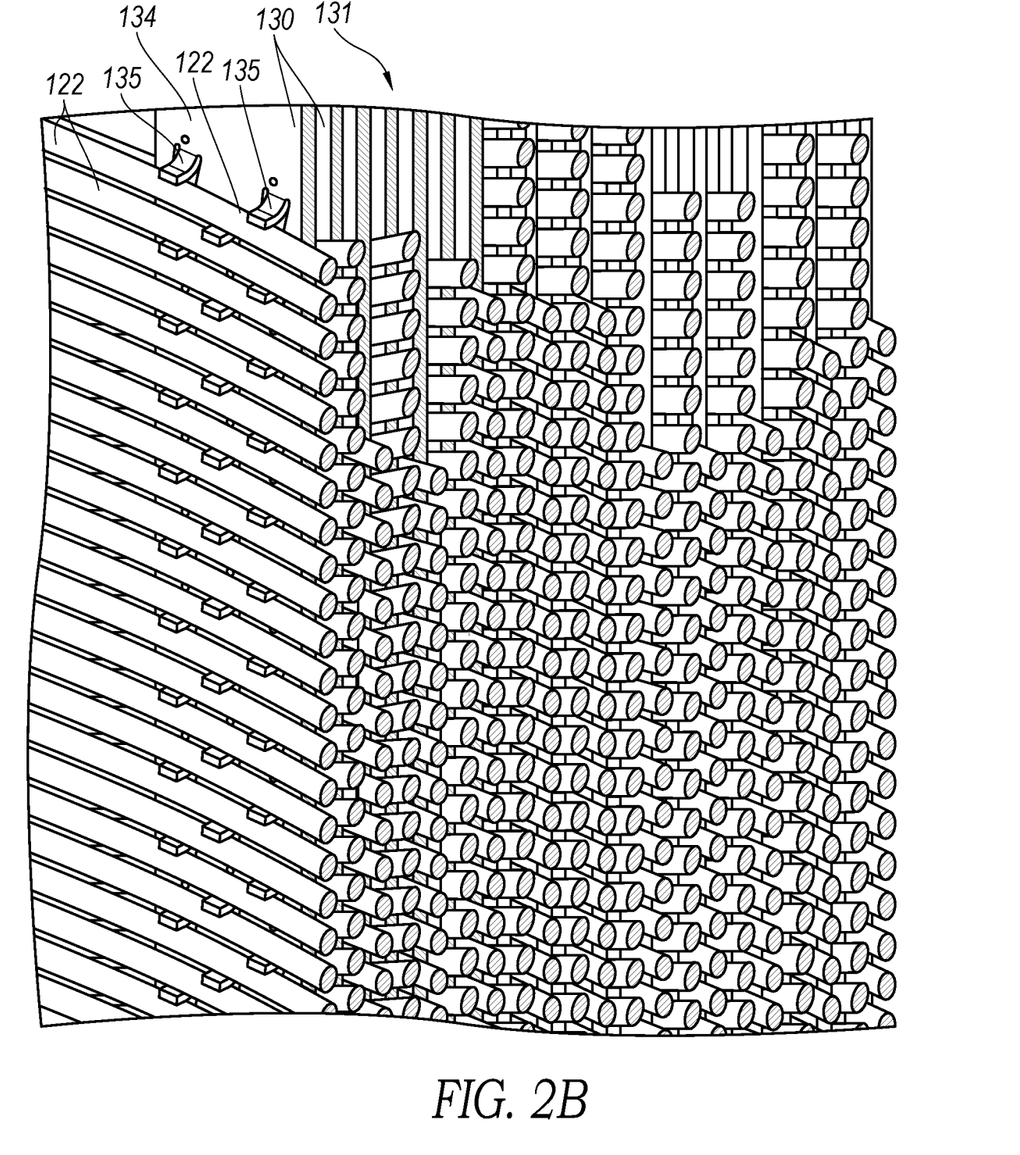
FIG. 2B is an enlarged illustration of conduit supports and associated conduits, arranged in accordance with embodiments of the present technology.

FIG. 2B is an enlarged illustration of a portion of a representative conduit support stack 131, illustrating multiple conduit supports 130 and corresponding conduits 122. Each conduit support 130 can include a carrier portion 134 and one or more retainer portions 135. For example, as shown in FIG. 2B, the retainer portions 135 can include projections that extend under and/or over each conduit 122 to support the conduits 122 in position. Generally, the conduits 122 are not rigidly attached to the retainer portions 135 to accommodate dimensional changes, e.g., due to thermal expansion. As shown in FIG. 2B, the conduit support stack 131 includes multiple, spaced-apart conduit supports 130, with "layers" of conduits 122 supported between neighboring pairs of conduit supports 130.

Figure 2C:
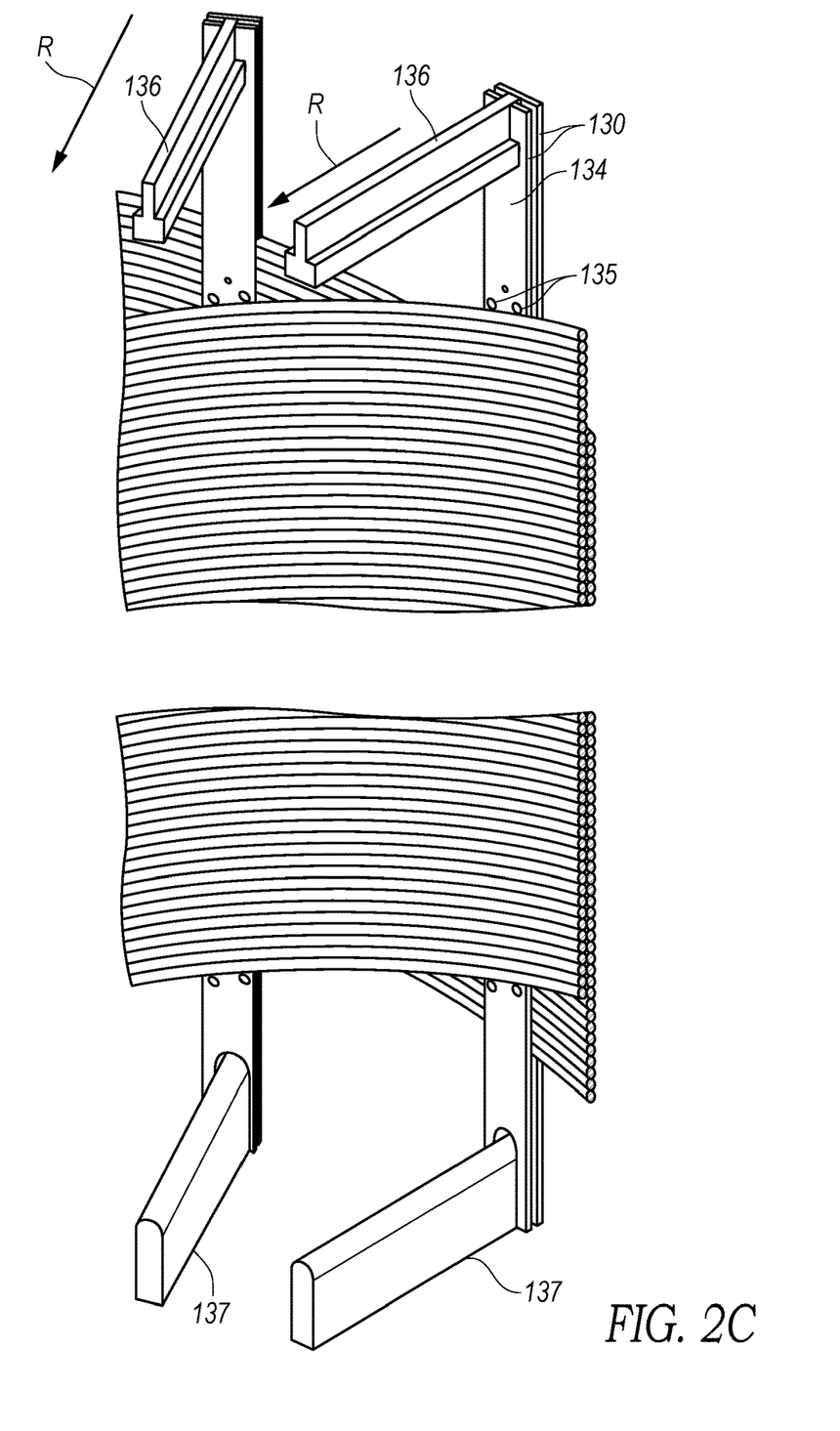
FIG. 2C is a partially schematic illustration of an arrangement of rails for aligning and supporting multiple conduit supports, in accordance with embodiments of the present technology.

FIG. 2C illustrates the upper support rails 136 and lower support rails 137 positioned to align corresponding conduit supports 130. For purposes of illustration, two pairs of conduit supports 130 are shown aligned with corresponding pairs of upper and lower support rails 136, 137. Multiple additional conduit supports 130 can then be aligned along the rails 136, 137 in a radial direction R, as is shown in FIGS. 2A and 2B.

Figure 3:
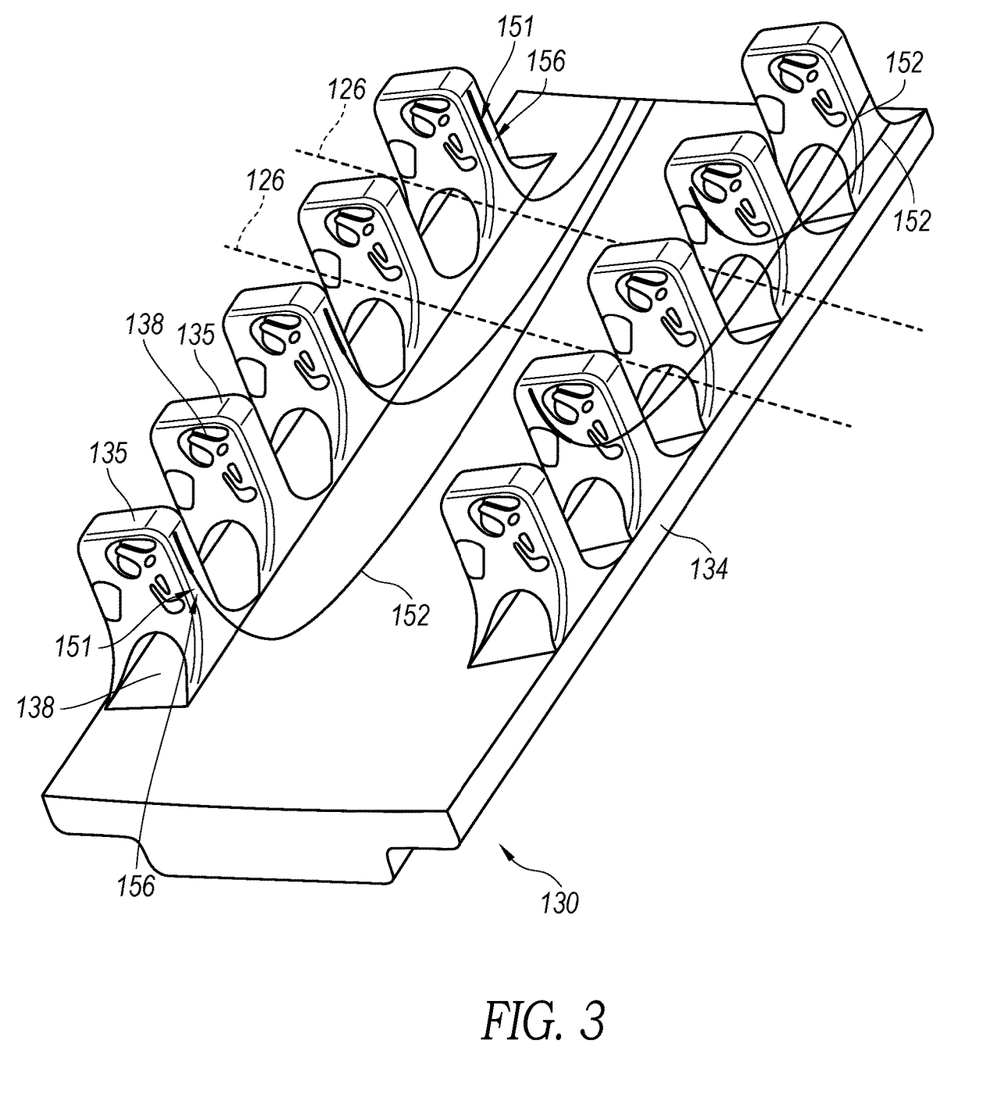
FIG. 3 is a partially schematic, isometric illustration of a conduit support having one or more sensors integrally manufactured via additive manufacturing techniques, in accordance with embodiments of the present technology.

FIG. 3 is a partially schematic, isometric illustration of a representative conduit support 130 configured in accordance with embodiments of the present technology. The conduit support 130 can include a carrier portion 134, multiple retainer portions 135, and one or more sensors 151, all of which are integrally formed as a single unit. Accordingly, the conduit support 130 may be referred to herein as an instrumented support, or an instrumented conduit support. For example, the sensor 151, retainer portion 135, and carrier portion 134 can be integrally formed via an additive manufacturing technique. Suitable techniques include using a laser powder bed, or a direct energy deposition 3-D printer. However, such techniques may be limited to applications for which the embedded sensors 151 can withstand the high temperatures typically associated with such 3-D printing techniques. For sensors that cannot withstand such temperatures, ultrasonic additive manufacturing (UAM) techniques can be used instead. For example, UAM techniques can be used to additively manufacture structures that include both metals and non-metal constituents, without melting either. This in turn can allow dissimilar metals to be bonded, and can facilitate adding cladding materials, metal matrix composites, and/or "smart" or reactive structures. As a result, the sensor electronics can be embedded (below the outer surface of the supporting structure) in a tamper-resistant and/or tamper-proof, protective structure (e.g., the structure of the conduit support 130). Put another way, the sensors can be fully or at least partially encapsulated/enclosed within the structure they are co-manufactured with, in a nondestructive manner, and are accordingly protected from the harsh environment within the steam generator. In addition, the structure can include complex internal geometries, which can be readily manufactured via additive manufacturing techniques, but which may be difficult and/or impractical to manufacture using conventional subtractive techniques. For example, the conduit supports 130 can include openings 138 that reduce the quantity of material used to form the supports, and/or reduce heat transfer away from the steam within the conduits. Still further, the need for post-manufacture treatments (e.g., machining) can be reduced or eliminated, as a result of the fidelity of the additive manufacturing process.

In a representative embodiment shown in FIG. 3, the sensors 151 include fiber optic strain gauges 156 and associated communication links 152 that may also include fiber optic elements. In one such embodiment, the strain gauges 156 are integrally formed with the retainer portions 135, they can accurately register changes in strain imposed on the retainer portions 135 by the conduits carried by the retainer portions 135. The conduits (shown in FIGS. 2A-2C) extend along corresponding conduit axes 126 from one conduit support 130 to the next. In various embodiments, the strain gauges 156 are integrally formed with the retainer portions 135, allowing the material of the retainer portions 135 can help shield the strain gauges, e.g., from gamma radiation emitted by the reactor core. Such radiation can discolor the optics of the strain gauge 156 and/or the communication links 152 and accordingly, reduce or eliminate the sensor operability. By embedding the optic strain gauges 156, e.g., in a metal material, the likelihood for such degradation can be reduced, deferred, and/or eliminated, thus improving the ability to measure strain characteristics in the steam generator. For example, as shown in FIG. 3, the strain gauges 156 can be integrated with the retainer portions 135, and the communication links 152 can be integrated with the carrier portions 134, as well as with the retainer portions 135. The material forming the conduit support (e.g., the carrier portions 134 and/or the retainer portions 135) can include stainless steel in some embodiments, and other suitable materials in other embodiments.

Figure 4:
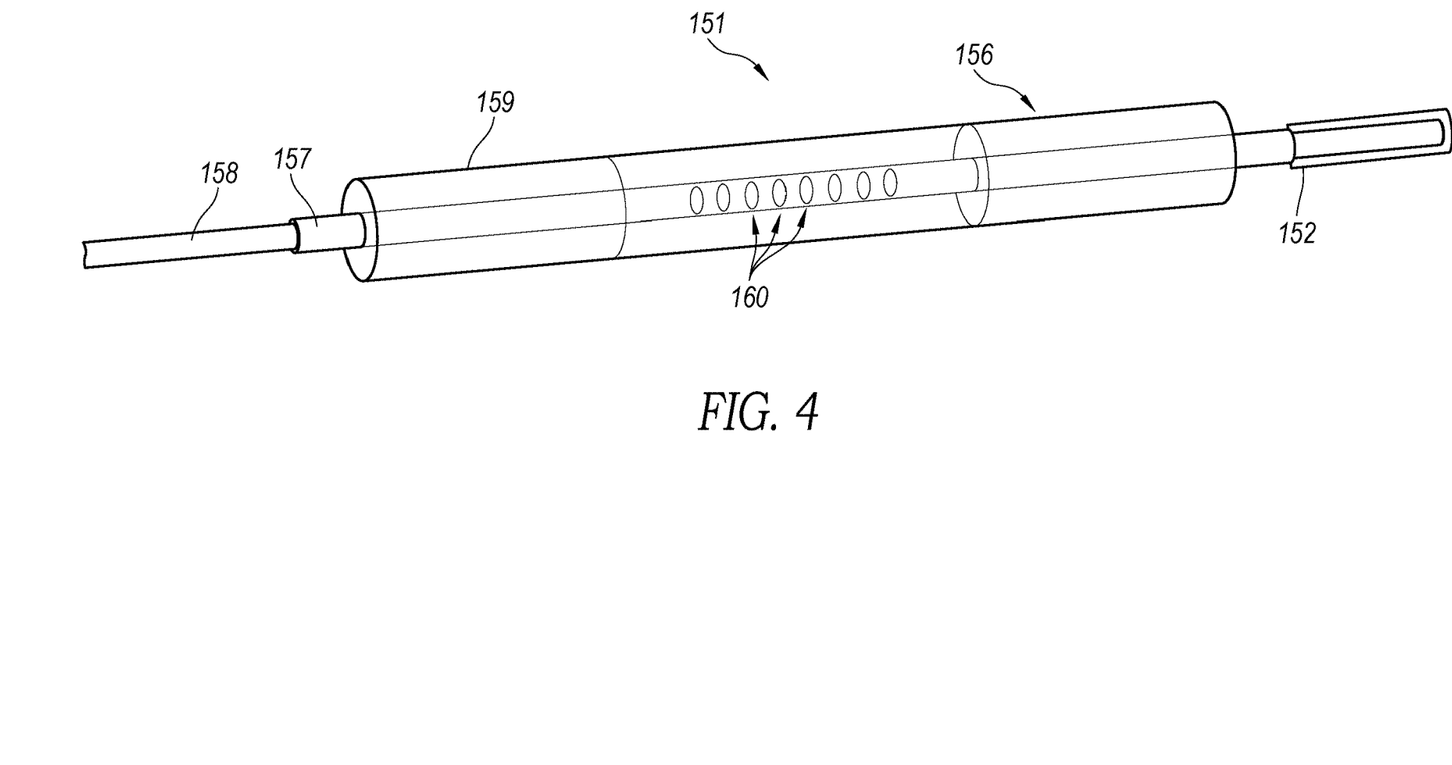
FIG. 4 is a partially schematic illustration of a representative sensor suitable for being integrally formed with a conduit support in accordance with embodiments of the present technology.

FIG. 4 illustrates a representative fiber optic strain gauge 156 having a generally conventional construction, but formed using a UAM technique integrally with a corresponding support. One possible representative device for performing such a technique includes a SonicLayer® 7200 automated system, available from Aniwaa (www.aniwaa.com). It is understood that the above is merely one illustrative example to which the disclosed subject matter is not limited. The UAM system can form a silica core 157 which transmits a light beam 158 and is surrounded by a cladding 159 for protection and to prevent light from escaping the core 157. The core 157 can include multiple Bragg grading elements 160 that refract and/or reflect light in different manners depending upon whether the strain gauge 156 is under strain and, if under strain, the value of the strain. The UAM process can also include forming the communication link 152 (FIG. 3) concurrently with the strain gauge 156 and the surrounding conduit support 130. Multiple communication links 152 can be routed through the corresponding conduit supports to a suitable junction box or other connection structure. Data collected by the sensors can then be routed out of the nuclear reactor via the flange 153 described above with reference to FIG. 1. Notably, at least one material forming the strain gauge 156 and/or other type(s) of sensor(s), is different than at least one material forming the conduit support 130, and the additive manufacturing process is selected to perform successfully despite that disparity.

The data obtained from the sensors can be used for one or more purposes tied to increasing reactor efficiency and/or providing other benefits for the corresponding nuclear reactor. For example, in operation, the sensors can more accurately detect the strains that may correspond to density wave oscillations and/or other flow phenomena, so that the operator can adjust the system operational parameters to avoid generating such phenomena. In another application, the data can be used to design or re-design elements of the reactor to reduce the likelihood for density wave oscillations and/or other flow phenomena to occur. Or, in another representative embodiment, elements can be designed or re-designed to produce a target oscillation frequency value and/or amplitude value, e.g., a target value that is acceptable for reactor operations.

For purposes of illustration, the representative sensor shown in FIGS. 3 and 4 is an optical strain sensor. In other embodiments, the sensor can have other constructions and/or can be used to measure other parameter values. For example, the sensor can include a thermal sensor (e.g., a thermocouple) configured to measure local temperatures within the steam generator or other system components in which the sensor is positioned. The data obtained from the thermal sensors, in conjunction with data obtained from strain sensors, can be used to further quantify and/or understand the characteristics of density wave oscillations and/or other flow phenomena. In other embodiments, the thermal sensors (and/or other sensors) can be used independently to assess any of a variety of suitable flow parameters, thermal parameters, and/or structural parameters.

In any of the foregoing embodiments, the ability to additively manufacture the sensors concurrently with the structures in which they are placed, can be used to efficiently produce an array (e.g., a three-dimensional array) of sensors that can more accurately capture phenomena in a multi-dimensional environment than can a small, scattered set of sensors. This ability can further improve the accuracy of the data and the efficacy of the steps taken based on that data.

The data collected by the sensors described above can be generally static, and/or dynamic, depending upon the application. For example, density wave oscillations generally have a frequency of about 0.1 Hz-0.3 Hz in the boiling region within the steam generator conduits 122. Accordingly, the strain sensors can be configured to measure changes in strain at frequencies high enough to capture the foregoing periodicity.

In addition to the applications described above (e.g., improved steam generator reliability for future designs, and/or providing an early indication or prediction of steam generator conduit fatigue), the foregoing data can be used for other purposes, e.g., to narrow or focus the inspections of the steam generator and/or other elements of the reactor to areas that are most likely to require such inspections. This in turn can reduce the need for, and cost associated with, inspecting structures that may not require it. In another application, thermal data obtained from an array or network of thermal sensors can be used to more accurately predict heat transfer characteristics within the steam generator, which in turn can influence steam generator design and result in more efficient, robust, and/or inexpensive steam generators.

From the foregoing, it will be appreciated that specific embodiments of the disclosed technology have been described herein for purposes of illustration, but that various modifications may be made without deviating from the technology. For example, the sensors can detect parameters other than strain and/or temperature. The sensors can be non-optical sensors, and/or can communicate data via non-optical communication links. While representative embodiments illustrate sensors positioned in steam generator conduit supports, sensors in accordance with other embodiments can be positioned in other system elements. Sensors positioned in the steam generator can be incorporated into the retainer portions of the conduit supports, and/or other portions of the conduit supports, e.g., the carrier portions.

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

As used herein, the phrase "and/or," as in "A and/or B," refers to A alone, B alone, and both A and B.

Representative examples of the present technology are provided below.

Examples

1. A method, comprising:
   forming an instrumented conduit support, the instrumented conduit support including a carrier portion and a retainer portion, wherein forming the instrumented conduit support includes:
   integrally forming and embedding:
      (a) a fiber optic strain sensor with a conduit support, and
      (b) a fiber optic link with the carrier portion,
   via an additive manufacturing process.

2. The method of example 1, further comprising:
   supporting a helical steam conduit with the instrumented conduit support; and
   installing the helical steam conduit and the instrumented conduit support in a nuclear reactor, along a primary flow path positioned to circulate a heated primary flow in thermal communication with the helical steam conduit.

3. The method of any of examples 1-2 wherein the instrumented conduit support is one of a plurality of instrumented conduit supports carrying the helical steam conduit.

4. The method of any of examples 1-3 wherein the sensor includes at least one material that is not included in the conduit support.

5. The method of any of examples 1-4 wherein the instrumented conduit support is formed from stainless steel.

6. The method of any of examples 1-5 wherein the additive manufacturing process includes an ultrasonic additive manufacturing process.

7. A method, comprising:
   forming an instrumented conduit support, the instrumented conduit support including a carrier portion and retainer portion, at least one of the carrier portion or the retainer portion being integrally formed with a sensor via an additive manufacturing process; and
   coupling the sensor to a communication link.

8. The method of example 7, further comprising:
   supporting a helical steam conduit with the instrumented conduit support; and
   installing the helical steam conduit and the instrumented conduit support in a nuclear reactor, along a primary flow path positioned to circulate a heated primary flow in thermal communication with the helical steam conduit.

9. The method of any of examples 7-8 wherein the communication link includes an optical link.

10. The method of example 9, further comprising forming at least part of the optical link to be within an outer surface of the at least one of the carrier portion or the retainer portion.

11. The method of any of examples 7-10 wherein the sensor is formed to be within an outer surface of the at least one of the carrier portion or the retainer portion.

12. The method of any of examples 7-11 wherein the sensor includes a strain sensor.

13. The method of any of examples 7-12 wherein the sensor includes a thermal sensor.

14. The method of any of examples 7-13 wherein the additive manufacturing process includes an ultrasonic additive manufacturing process.

15. The method of any of examples 7-14 wherein the process of forming the instrumented support includes forming the sensor within an outer surface of the at least one of the retainer portion or the carrier portion.

16. A method for sensing characteristics of a nuclear reactor, comprising:
receiving at least one of:
(a) thermal data or
(b) strain data
from a sensor integrally formed with a conduit support, the conduit support carrying a helical steam generator conduit in a nuclear reactor;
based on the received data, evaluating a oscillatory characteristic of the helical steam generator.

17. The method of example 16, further comprising changing an operating characteristic of the nuclear reactor, based at least in part on the received data.

18. The method of any of examples 16-17, further comprising changing a design of the helical steam generator, based at least in part on the received data.

19. The method of any of examples 16-18 wherein the oscillatory characteristic is a frequency of an oscillatory motion undergone by the helical steam generator.

20. The method of any of examples 16-19 wherein the oscillatory characteristic is an amplitude of an oscillatory motion undergone by the helical steam generator.

21. A device, comprising:
an instrumented conduit support, the instrumented conduit support including:
a carrier portion;
a retainer portion carried by the carrier portion, wherein:
(a) the carrier portion is integrally formed with a sensor via an additive manufacturing process; or
(b) the retainer portion is integrally formed with a sensor via an additive manufacturing process; or
(c) both (a) and (b).

22. The device of example 21, further comprising:
a pressure vessel;
a core positioned in the pressure vessel and configured to carry a fissile material;
a containment vessel positioned around the pressure vessel;
a riser tube in fluid communication with the core and positioned to direct a primary fluid flow along a primary flow path upwardly from the core, the primary flow path also passing downwardly in an annulus between the riser tube and the pressure vessel to circulate the primary fluid flow; and
a steam generator positioned in the annulus, the steam generator including a helical steam conduit carried by the instrumented conduit support.

23. The system of any of examples 21-22 wherein the sensor is embedded within the carrier portion and/or at least one of the plurality of retainer portions.

24. The system of any of examples 21-23 wherein the sensor includes an optical sensor, and wherein the system further comprises an optical communication link coupled to the optical sensor and positioned within at least one of the carrier portion or the retainer portion.

I claim:

1. A method, comprising:
forming an instrumented conduit support for a steam generator conduit, the instrumented conduit support including a carrier portion and a retainer portion, wherein forming the instrumented conduit support includes:
(a) integrally forming and embedding a fiber optic strain sensor, within a conduit support, via an additive manufacturing process, and
(b) integrally forming and embedding a fiber optic link, within the carrier portion, via an additive manufacturing process, such that the fiber optic link is coupled to the fiber optic strain sensor;
supporting a helical steam conduit with the instrumented conduit support, and
installing the helical steam conduit and the instrumented conduit support in a nuclear reactor, along a primary flow path positioned to circulate a heated primary flow in thermal communication with the helical steam conduit.

2. The method of claim 1 wherein the instrumented conduit support is one of a plurality of instrumented conduit supports carrying the helical steam conduit.

3. The method of claim 1 wherein the fiber optic strain sensor includes at least one material that is not included in the conduit support.

4. The method of claim 1 wherein the instrumented conduit support is formed from stainless steel.

5. The method of claim 1 wherein the additive manufacturing process includes an ultrasonic additive manufacturing process.

6. A method, comprising:
forming an instrumented conduit support, the instrumented conduit support including a carrier portion and a retainer portion, at least one of the carrier portion or the retainer portion being integrally formed with a sensor via an additive manufacturing process, such that the sensor is embedded in the at least one of the carrier portion or the retainer portion;
coupling the sensor to a communication link;
supporting a helical steam conduit with the instrumented conduit support; and
installing the helical steam conduit and the instrumented conduit support in a nuclear reactor, along a primary flow path positioned to circulate a heated primary flow in thermal communication with the helical steam conduit.

7. The method of claim 6 wherein the communication link includes an optical link.

8. The method of claim 7, further comprising forming at least part of the optical link to be within an outer surface of the at least one of the carrier portion or the retainer portion.

9. The method of claim 6 wherein the sensor is formed to be within an outer surface of the at least one of the carrier portion or the retainer portion.

10. The method of claim 6 wherein the sensor includes a strain sensor.

11. The method of claim 6 wherein the sensor includes a thermal sensor.

12. The method of claim 6 wherein the additive manufacturing process incudes an ultrasonic additive manufacturing process.

* * * * *